April 19, 1927.  J. A. TALBOT  1,625,169
WEEDER
Filed July 23, 1925
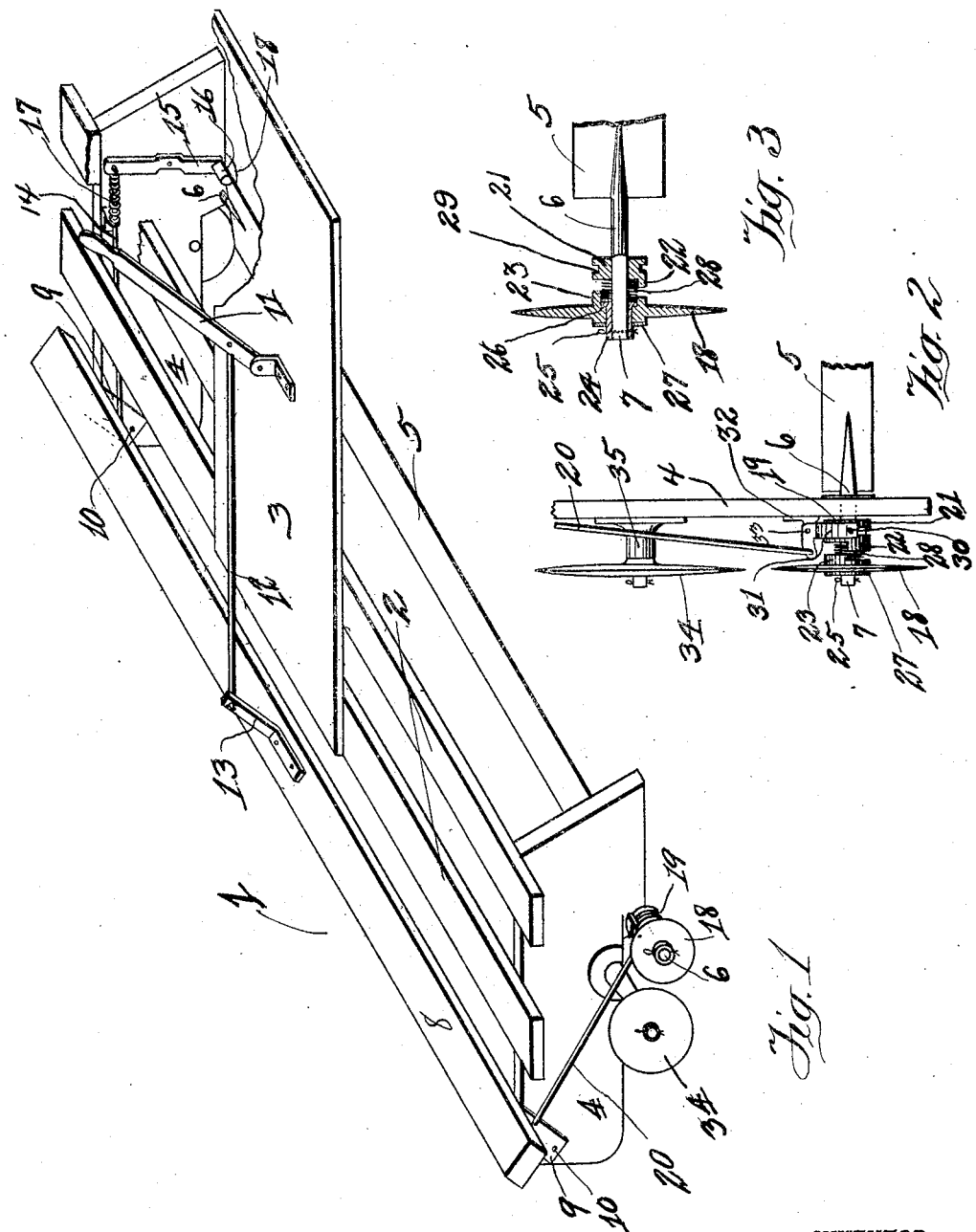
INVENTOR
James A. Talbot
BY
E. E. Sauzé
ATTORNEY Patented Apr. 19, 1927.

1,625,169

UNITED STATES PATENT OFFICE.

JAMES A. TALBOT, OF WALLA WALLA, WASHINGTON, ASSIGNOR OF ONE-HALF TO S. V. DAVIN, OF WALLA WALLA, WASHINGTON.

WEEDER.

Application filed July 23, 1925. Serial No. 45,519.

This invention relates to weeders and has as one of its objects to provide a weeder having a rotatable cutting blade and affording a means for the positive rotation of the blade.

Another object of the invention is to provide a weeder having a wheel engageable with the soil for rotating the blade, and providing a means whereby the wheel will run idle when the blade is in operation and secured by a tripping means, and that will automatically rotate the blade with the release of the tripping means.

A further object of the invention is to provide a weeder having an idle cutting disc positioned in trace with the means for rotating the cutting blade that will produce a true path for the rotating means and prevent it from rising out of the ground with the rotation of the blade.

With these and other objects in view reference is now had to the accompanying drawings in which—

Fig. 1 is a perspective view of the weeder;

Fig. 2 is a plan view of the cutting disc and the rotating means; and

Fig. 3 is a sectional view of the clutch mechanism.

Having reference to the drawings like numerals refer to like parts throughout the several views and the numeral 1 refers to a weeder comprising in general a frame 2, a platform 3 mounted on the frame, runners 4 rigidly attached to the frame, and a cutting blade 5 rotatably mounted in the weeder.

The blade is provided on its ends with axles 6 that are made a part of the blade as shown and extend to pass through the runners, the latter forming a bearing therefor, and the axles are provided with squared ends 7, as shown in Fig. 3, for a purpose to be explained.

The blade is held in the operative position, and released therefrom, by a tripping means comprising a beam 8 that extends longitudinally of the weeder to which it is attached by means of depending plates 9 that are pivotally attached to the runners by bolts 10.

By this arrangement the beam may be oscillated forward or backward, this movement being accomplished by an operating lever 11 operably mounted on the platform 3, with a horizontally disposed rod 12 connecting the operating lever with a raised arm 13 that is rigidly secured to the beam 8.

Attached to the plates 9 for movement therewith is a rod 14 that extends rearward to pivotally engage vertically positioned bars 15 that are pivotally attached to the runners, the bars in turn having rollers 16 rotatably mounted on their ends to engage the rear end of the cutting blade and prevent it from rotating by the resistance of the soil, with a spring 17 suitably mounted on the rod to yieldingly restore the bar to a normal vertical position with the roller engaging the blade as above mentioned.

The blade is rotated by a ground wheel 18 that depends for its rotation upon its frictional contact with the soil through which it passes, and the two are connected by means of a clutch mechanism 19 interposed between the ground wheel and the blade and positioned adjacent to the runner, with a connecting rod 20 connecting the clutch with the above mentioned depending plate 9. By this means the clutch will be operated automatically with the movement of the beam when the latter is moved to trip the blade.

The ground wheel and clutch consist of a clutch collar 21 slidably mounted on the squared end 7 of the axle, and the clutch collar is provided with the usual projecting dog 22 that is engageable with a complemental dog 23 attached to, or preferably made a part of, the ground wheel. The ground wheel is rotatably mounted on a collar 24 that is secured on the end of the axle by a cotter key 25 or other suitable means.

The collar 24 has an inner flange 26 against which the ground wheel rotates, and the ground wheel is secured on the collar by means of a washer 27 that in turn is held in place by the said cotter key. A spring 28 is interposed between the ground wheel and the clutch collar to maintain the clutch normally free so that the ground wheel may rotate at all times during the movement of the weeder, and the clutch collar is provided with a groove 29 that will receive a pin 30 attached to the clutch lever 31.

The clutch lever is operably attached to the runner by means of a bracket 32 that is suitably attached to the runner and to which the lever is suitably attached by a bolt 33.

By this arrangement it will now be obvious that upon operating the tripping mechanism the connecting rod and the clutch lever, and consequently the clutch, will move conjointly with the tripping mechanism to engage the ground wheel as the tripping mechanism is released, and that the ground wheel will then turn the axle and rotate the blade. Now as the spring of the tripping mechanism restores it to its normal position the ground wheel will continue its revolutions without affecting the blade.

Positioned ahead of and in trace with the ground wheel is a pilot cutting disc 34 that is idly mounted on a spindle 35 attached to the runner in any suitable manner. The cutting disc is designed with a sharpened edge and is arranged so that it will travel ahead of the ground wheel and cut a path therefor.

As the blade is constantly buried in the soil there is a tendency during rotation of the blade to raise the weeder enough to bring the blade out of the ground, and if there is a hard place encountered in the soil, by the ground wheel at the time of tripping, or if stubble or weeds are encountered, the blade will roll over the ground rather than in it. Hence with the cutting disc opening a way through such obstructions, and cutting the full depth of the ground wheel (the lower edge of both wheels being on a level) the weight of the weeder will maintain the blade in the soil at all times.

In operation the weeder moves over the ground to be cleaned of weeds, and the blade cuts the weeds.

Now, as the blade becomes foul from weeds adhering thereto, the operating lever is moved forward, which movement releases the roller from the blade and at the same time throws the clutch into engagement with the ground wheel when the latter will rotate the blade until the tripping mechanism is released, and the roller again engages the rear edge of the blade.

As the tripping mechanism is released the clutch returns to its normal position, actuated by its spring, and the ground wheel then continues to rotate on its collar without affecting the blade.

Having thus described my invention, I claim:

1. In a weeder, the combination with a weeder having a rotatable blade, and tripping means for controlling the rotation of the blade, of a loose ground wheel idly mounted on the axle of said blade, a clutch interposed between said wheel and the blade, and means to operate said clutch to rotate the blade as the tripping means is released.

2. In a weeder, the combination with a weeder having a rotatable blade, and a tripping means for controlling the rotation of the blade, of a pilot cutting disc idly mounted on the runner of said weeder, a loose ground wheel idly mounted on the axle of said blade and positioned in trace with the pilot disc, a clutch interposed between the ground wheel and the blade, and means to operate said clutch conjointly with said tripping means.

In testimony whereof I affix my signature.

JAMES A. TALBOT.